(12) United States Patent
Sako et al.

(10) Patent No.: US 9,253,303 B2
(45) Date of Patent: Feb. 2, 2016

(54) SIGNAL PROCESSING APPARATUS AND STORAGE MEDIUM

(71) Applicant: SONY CORPORATION, Tokyo (JP)

(72) Inventors: Yoichiro Sako, Tokyo (JP); Tomoya Onuma, Shizuoka (JP); Kazuyuki Sakoda, Chiba (JP); Akira Tange, Tokyo (JP); Kohei Asada, Kanagawa (JP)

(73) Assignee: Sony Corporation, Tokyo (JP)

( * ) Notice: Subject to any disclaimer, the term of this patent is extended or adjusted under 35 U.S.C. 154(b) by 142 days.

(21) Appl. No.: 14/022,786

(22) Filed: Sep. 10, 2013

(65) Prior Publication Data

US 2014/0079212 A1  Mar. 20, 2014

(30) Foreign Application Priority Data

Sep. 20, 2012  (JP) ................................. 2012-206849

(51) Int. Cl.
| H04M 1/60 | (2006.01) |
| H04M 1/2745 | (2006.01) |
| H04M 1/725 | (2006.01) |

(52) U.S. Cl.
CPC .......... *H04M 1/60* (2013.01); *H04M 1/274508* (2013.01); *H04M 1/72572* (2013.01)

(58) Field of Classification Search
None
See application file for complete search history.

(56) References Cited

U.S. PATENT DOCUMENTS

| 6,744,882 B1 * | 6/2004 | Gupta ................. H04M 1/6008 379/387.01 |
| 8,131,848 B1 * | 3/2012 | Denise .......................... 709/224 |
| 2009/0086933 A1 * | 4/2009 | Patel et al. ...................... 379/52 |
| 2010/0080396 A1 * | 4/2010 | Aoyagi ........................... 381/17 |
| 2011/0044474 A1 * | 2/2011 | Grover et al. ................. 381/107 |
| 2013/0089194 A1 * | 4/2013 | Bedingfield, Sr. ........ 379/202.01 |
| 2013/0279709 A1 * | 10/2013 | Suzuki et al. ................... 381/57 |

FOREIGN PATENT DOCUMENTS

| JP | 2010-135978 A | 6/2010 |
| JP | 2010-141806 A | 6/2010 |

* cited by examiner

*Primary Examiner* — Fan Tsang
*Assistant Examiner* — Jeffrey Lytle
(74) *Attorney, Agent, or Firm* — Sony Corporation

(57) ABSTRACT

There is provided a signal processing apparatus including a recognition section configured to recognize at least one of a state of a first user, a state of a second user, and a relationship between the first user and the second user, a signal processing unit configured to perform signal processing on voice information corresponding to voice articulated by the first user, or voice information corresponding to voice that is transmitted from a remote location and articulated by the second user, and a control unit configured to control the signal processing unit to perform signal processing on at least one of the voice information corresponding to the voice articulated by the first user, and the voice information corresponding to the voice that is transmitted from the remote location and articulated by the second user, in accordance with a recognition result of the recognition section.

18 Claims, 9 Drawing Sheets

USER A

| ADDRESSEE | RELATIONSHIP WITH ADDRESSEE |
|---|---|
| USER B | FRIEND |
| USER C | SPECIAL |
| USER D | WORK |
| ⋮ | ⋮ |

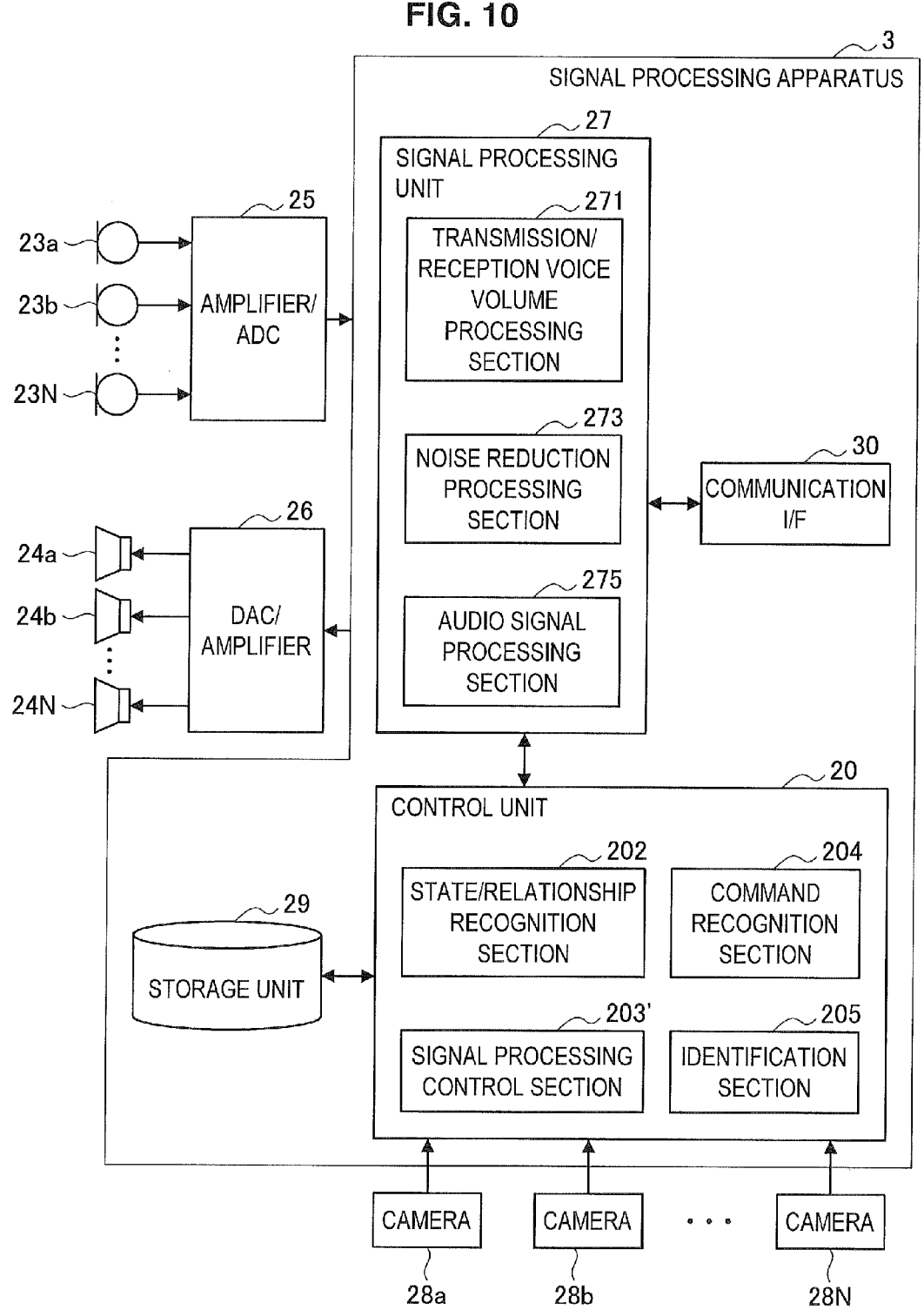

SIGNAL PROCESSING APPARATUS AND STORAGE MEDIUM

BACKGROUND

The present disclosure relates to a signal processing apparatus and a storage medium.

Generally speaking, while it is possible to manually adjust a reception voice volume during a telephone conversation on a mobile phone, a smartphone, a Personal Handy-phone System (PHS), a landline telephone, or the like, only one type of setting for a reception voice volume can be applied in all the types of telephone conversations. Consequently, a user has to change the setting for a reception voice volume in accordance with an addressee immediately after a conversation has started.

JP 2010-135978A therefore discloses a technique of associating a telephone number of an addressee with a reception voice volume, and automatically setting a reception voice volume level according to the addressee in order to smoothly start a conversation.

JP 2010-141806A also discloses a technique of setting a plurality of manipulation sound volume set values in advance, and using a transmission voice volume flag that links the manipulation sound volume set values with a telephone number, which allows a transmission voice volume to be changed during a telephone conversation.

SUMMARY

However, JP 2010-135978A and JP 2010-141806A both disclose the techniques of applying setting based on a reception/transmission voice volume level that has been associated with a telephone number in advance. Accordingly, if the reception/transmission voice volume level has not been associated with a telephone number in advance, it is not possible to change the voice volume.

Since only one reception/transmission voice volume is associated with one telephone number in advance, it is also difficult to change the reception/transmission voice volume level in accordance with an environment of a user during a telephone conversation and a relationship between a user and a partner user (addressee).

The present disclosure therefore proposes a signal processing apparatus and a storage medium that are novel and improved, and can change a telephone conversation state in accordance with an environment of a user.

According to an embodiment of the present disclosure, there is provided a signal processing apparatus including a recognition section configured to recognize at least one of a state of a first user, a state of a second user, and a relationship between the first user and the second user, a signal processing unit configured to perform signal processing on voice information corresponding to voice articulated by the first user, or voice information corresponding to voice that is transmitted from a remote location and articulated by the second user, and a control unit configured to control the signal processing unit to perform signal processing on at least one of the voice information corresponding to the voice articulated by the first user, and the voice information corresponding to the voice that is transmitted from the remote location and articulated by the second user, in accordance with a recognition result of the recognition section.

According to another embodiment of the present disclosure, there is provided a non-transitory computer-readable storage medium having a program stored therein, the program causing a computer to function as a recognition section configured to recognize at least one of a state of a first user, a state of a second user, and a relationship between the first user and the second user, a signal processing unit configured to perform signal processing on voice information corresponding to voice articulated by the first user, or voice information corresponding to voice that is transmitted from a remote location and articulated by the second user, and a control unit configured to control the signal processing unit to perform signal processing on at least one of the voice information corresponding to the voice articulated by the first user, and the voice information corresponding to the voice that is transmitted from the remote location and articulated by the second user, in accordance with a recognition result of the recognition section.

According to embodiments of the present disclosure, it becomes possible to change a telephone conversation state in accordance with an environment of a user.

BRIEF DESCRIPTION OF THE DRAWINGS

FIG. 10 is a block diagram illustrating a configuration of a signal processing apparatus according to the second embodiment.

DETAILED DESCRIPTION OF THE EMBODIMENT(S)

Figure 1:
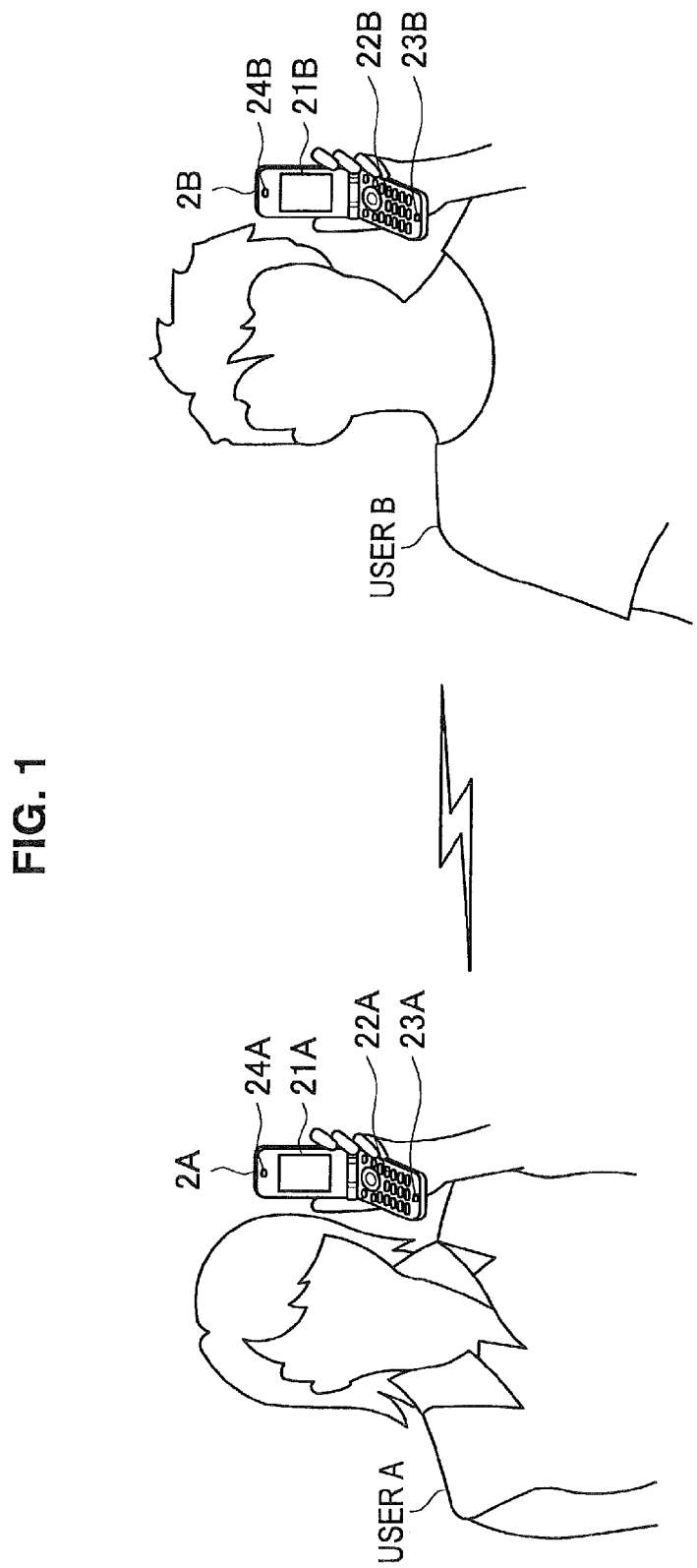
FIG. 1 is a diagram for describing an overview of a signal processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in order described below:
1. Overview of Signal Processing System According to Embodiment of Present Disclosure
2. Each Embodiment
2-1. First Embodiment
2-2. Second Embodiment
3. Conclusion

1. OVERVIEW OF SIGNAL PROCESSING SYSTEM ACCORDING TO EMBODIMENT OF PRESENT DISCLOSURE

First, with reference to FIG. 1, an overview of a signal processing system according to an embodiment of the present disclosure will be described.

FIG. 1 is a diagram for describing the overview of the signal processing system according to the embodiment of the present disclosure. As illustrated in FIG. 1, in the present embodiment, a telephone conversation state is changed while a user A and a user B have a telephone conversation on mobile phone terminals 2A and 2B, which are examples of a signal processing apparatus, in accordance with a state of each user and a relationship between the users. As illustrated in FIG. 1, the mobile phone terminals 2A and 2B include microphones (which will be also referred to as mics) 23A and 23B, speakers 24A and 24B, displays 21A and 21B, and manipulation input units 22A and 22B.

As described above, a user manually controls a reception voice volume of a general mobile phone terminal, a smartphone, or a landline telephone, for example. However, since the user can apply only one type of setting in all the types of telephone conversations, the user has to change the setting for a reception voice volume every telephone conversation in accordance with an addressee.

Although JP 2010-135978A and JP 2010-141806A each disclose a talking terminal that automatically applies setting, based on a reception/transmission voice volume level associated with a telephone number in advance, it is not possible to change the voice volume if the reception/transmission voice volume level has not been associated in advance. It is also difficult to change the reception/transmission voice volume level in accordance with an environment of a user during a telephone conversation, and a relationship between a user and a partner user (addressee).

In view of such circumstances, there is provided a signal processing system (signal processing apparatus) according to each embodiment of the present disclosure. The signal processing system according to each embodiment of the present disclosure can automatically change a telephone conversation state in accordance with an environment of a user.

For example, if the user B is hard of hearing or a communication state is not good, it is hard for the user B to hear the voice of the user A. Consequently, the user B tends to speak loud. In this case, the user A may feel uncomfortable because the voice (reception voice) of the user B is too loud.

For example, the mobile phone terminal 2A therefore recognizes a state of the user B that the user B is, for example, hard of hearing, and outputs the voice (reception voice) of the user B, which are collected from the mic 23B of the mobile phone terminal 2B and transmitted, from the speaker 24A with a voice volume decreased. The mobile phone terminal 2A may also transmit the voice (transmission voice) of the user A, which is collected by the mic 23A, to the mobile phone terminal 2B with a voice volume increased.

As explained above, the overview of the signal processing system according to the embodiment of the present disclosure has been described. Next, a plurality of embodiments will be seen to describe the signal processing system according to the present embodiment in detail. Although the example illustrated in FIG. 1 uses the mobile phone terminals as examples of the signal processing apparatus according to the embodiment of the present disclosure, the signal processing apparatus according to each embodiment of the present disclosure is not limited thereto. For example, a smartphone, a tablet terminal, a PHS, or a landline telephone may also be adopted.

The signal processing apparatus according to each embodiment of the present disclosure may also be an information processing apparatus that provides an internet telephone service.

2. EACH EMBODIMENT

2-1. First Embodiment

Figure 2:
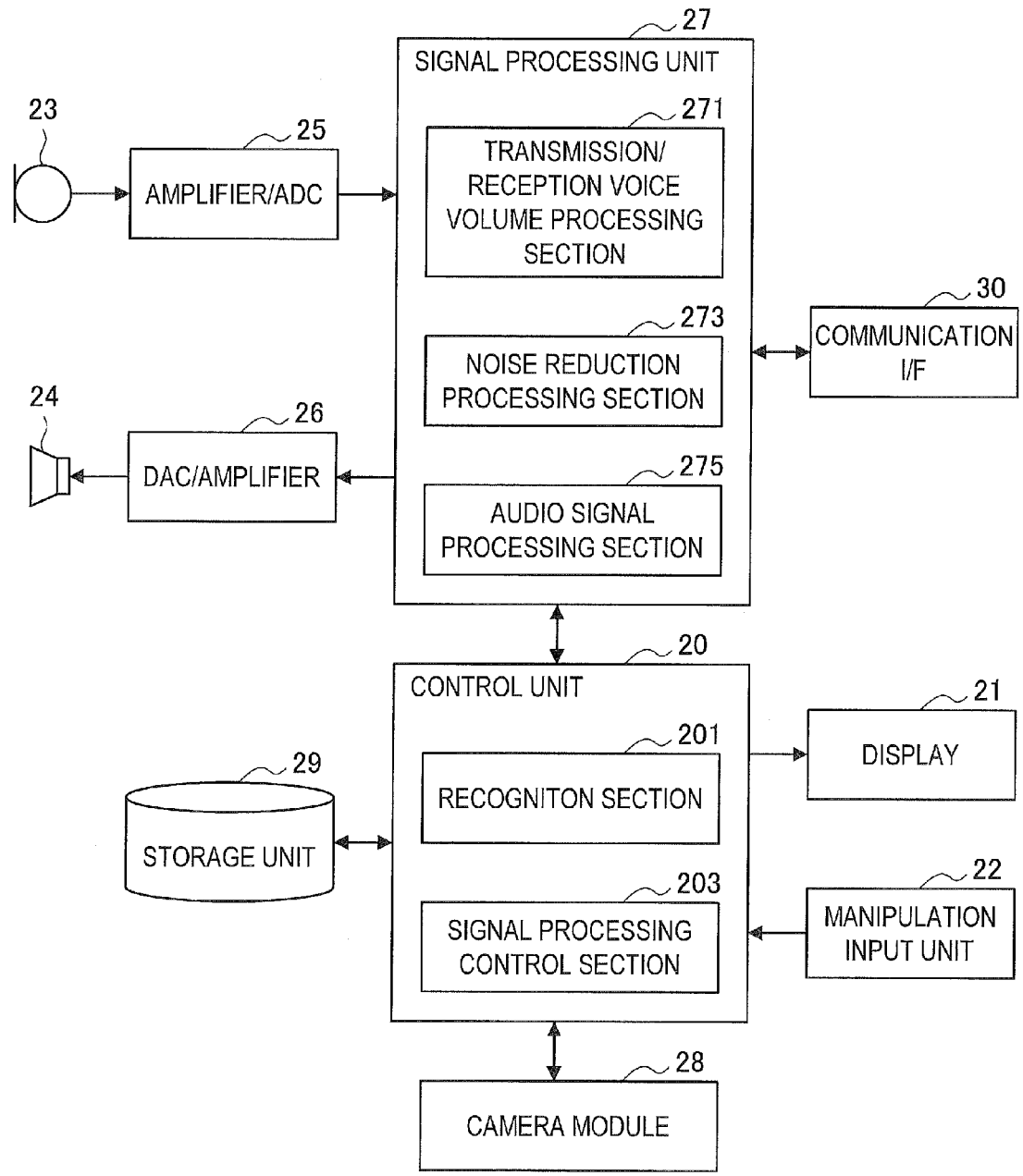
FIG. 2 is a block diagram for describing a configuration of a mobile phone terminal according to a first embodiment.

In the mobile phone terminals 2 illustrated in FIG. 1, a signal processing system according to a first embodiment recognizes a state of the user A, a state of the user B, or a relationship between the user A and the user B, and automatically changes a telephone conversation state based on the recognition result. With reference to FIG. 2, a configuration of the mobile phone terminal 2 according to the present embodiment will be specifically described below.

(2-1-1. Configuration)

FIG. 2 is a block diagram for describing the configuration of the mobile phone terminal according to the present embodiment. As illustrated in FIG. 2, the mobile phone terminal 2 according to the present embodiment includes a control unit 20, a display 21, a manipulation input unit 22, a microphone 23 (which will be referred to as the mic 23), a speaker 24, an amplifier/analog-digital converter (ADC) 25, a digital-analog converter (DAC)/amplifier 26, a signal processing unit 27, a camera module 28, a storage unit 29, and a communication interface (I/F) 30.

(Display)

For example, the display 21 displays a menu screen and various manipulation screens in accordance with control of the control unit 20. The display 21 is realized using a Liquid Crystal Display (LCD) or an Organic Light-Emitting Diode (OLED), for example.

(Manipulation Input Unit)

The manipulation input unit 22 detects a manipulation input of a user. Specifically, the manipulation input unit 22 may be realized using various buttons physically provided on the mobile phone terminal 2 as illustrated in FIG. 1, or using a touch panel that detects a touched position of the user with respect to the screen displayed on the display 21.

(Mic)

The mic 23 collects the voice of a user, and outputs voice information (audio signals) corresponding to the voice of the user to the amplifier/ADC 25.

(Amplifier/ADC)

The amplifier/ADC 25 includes an amplifier configured to amplify the voice information output from the mic 23, and an ADC configured to convert the voice information amplified by the amplifier from analog electric signals to digital electric signals. The amplifier/ADC 25 also outputs the voice information that has been converted to digital electric signals to the signal processing unit 27.

(DAC/Amplifier)

The DAC/amplifier 26 includes an ADC configured to convert voice information of an addressee output from the signal processing unit 27 from digital electric signals to analog electric signals, and an amplifier configured to amplify the voice information that has been converted to analog electric signals. The DAC/amplifier 26 also outputs the voice information that has been converted to analog digital signals and amplified to the speaker 24.

(Speaker)

The speaker 24 has a function of outputting (playing back) the voice information output from the DAC/amplifier 26.

(Signal Processing Unit)

The signal processing unit 27 has a function of performing predetermined signal processing (changes a telephone conversation state) on the voice information (transmission voice) that has been collected by the mic 23 and output from the amplifier/ADC 25, or the voice information (reception voice) that has been received by the communication I/F 30 in accordance with control of the control unit 20. More specifically, as illustrated in FIG. 2, the signal processing unit 27 according to the present embodiment functions as a transmission/reception voice volume processing section 271, a noise reduction processing section 273, and an audio signal processing section 275.

Transmission/Reception Voice Volume Processing Section

The transmission/reception voice volume processing section 271 has a function of changing a voice volume of voice information (transmission voice/reception voice).

Noise Reduction Processing Section

The noise reduction processing section 273 has a function of reducing noise such as background noise from voice information, and increasing a signal to noise (S/N) ratio. Specifically, for example, the noise reduction processing section 273 is realized using a filter circuit such as a low pass filter (LPF), a band elimination filter (BEF), a band pass filter (BPF), and a high pass filter (HPF).

Audio Signal Processing Section

For example, the audio signal processing section 275 codes, decodes, or processes voice information (audio signals), or performs signal processing (sound image localization processing) on voice information (audio signals) for localizing a position for a sound image. For example, the audio signal processing section 275 codes voice information (transmission voice) corresponding to the voice of the user A collected by the mic 23, and outputs the coded voice information to the communication I/F 30. The audio signal processing section 275 decodes voice information (reception voice) corresponding to the voice of the user B received by the communication I/F 30, and outputs the decoded voice information to the DAC/amplifier 26.

As a specific example of processing voice, a part of voice information is emphasized and the voice is changed in the voice information. For example, the audio signal processing section 275 converts voice information collected by the mic 23 to a frequency, extracts a frequency component indicating a feature of the user A, and increases an electric power value of the extracted frequency component to emphasize the voice of the user A.

(Camera Module)

The camera module 28 includes an imaging optical system including an image sensor and an imaging lens, and a captured image signal processor, and outputs data of a captured image in the form of digital signals. Additionally, for example, the image sensor is realized as a Charge Coupled Device (CCD) imager and a Complementary Metal Oxide Semiconductor (CMOS) imager.

The camera module 28 may be provided on a surface (outside) opposite to a surface on which the display 21 of the mobile phone terminal 2 is provided, or may be provided as an in-camera on the same surface (inside) as the surface on which the display 21 is provided.

(Storage Unit)

For example, the storage unit 29 stores address data in which a name is associated with a telephone number, and a program for executing various control by the control unit 20.

(Communication I/F)

The communication I/F 30 has a function of transmitting data to and receiving data from an external apparatus. Specifically, the communication I/F 30 according to the present embodiment transmits the coded voice information (transmission voice) output from the signal processing unit 27 to a communication terminal of an addressee. The communication I/F 30 receives voice information (reception voice) of an addressee from the communication terminal of the addressee, and outputs the voice information to the signal processing unit 27.

(Control Unit)

The control unit 20 has a function of controlling each configuration of the mobile phone terminal 2. Specifically, as illustrated in FIG. 2, the control unit 20 according to the present embodiment functions as a recognition section 201 and a signal processing control section 203.

Recognition Section

The recognition section 201 recognizes a state of the user A, a state of the user B, who is an addressee, or a relationship between the user A and the user B. Specifically, for example, the recognition section 201 according to the present embodiment recognizes a state (such as good, bad, poor hearing, hard of hearing, and age) of the user A, based on an image obtained by capturing the face of the user A which is output from the camera module 28 or the voice information of the user A collected by the mic 23. For example, the recognition section 201 recognizes a state (such as poor hearing, hard of hearing, and age) of the user B, based on the voice information of the user B which is received through the communication I/F 30 and an image obtained by capturing the face of the user B. The recognition section 201 further recognizes a relationship (such as friend, special (husband and wife, and boyfriend and girlfriend), work, good/bad, friendly/unfriendly) between the user A and the user B, based on relationship information with respect to the user B, which is input by the user A.

Signal Processing Control Section

The signal processing control section 203 controls the signal processing unit 27 to perform predetermined signal processing on voice information. The signal processing control section 203 may also control the signal processing unit 27 to perform predetermined signal processing on voice information in accordance with the recognition result of the recognition section 201. In addition, the signal processing according to the recognition result will be described in detail in the following operational processing according to the present embodiment.

As explained above, the specific configuration of the mobile phone terminal 2 according to the present embodiment has been described in detail. Next, operational processing of the mobile phone terminal 2 according to the present embodiment will be described. As described above, the mobile phone terminal 2 according to the present embodiment can automatically change a telephone conversation state in accordance with an environment (a state of the user A, a state of the user B, or a relationship between the user A and the user B) of a user. First to third operational processing will be used to specifically describe processing that is performed by the mobile phone terminal 2 to change a telephone conversation state in accordance with an environment of a user.

(2-1-2. First Operational Processing)

According to the first operational processing, the mobile phone terminal 2 recognizes whether the user B, who is an addressee, is hard of hearing (auditory disturbance and low hearing ability), and can change a telephone conversation state in accordance with the recognition result.

Figure 3:
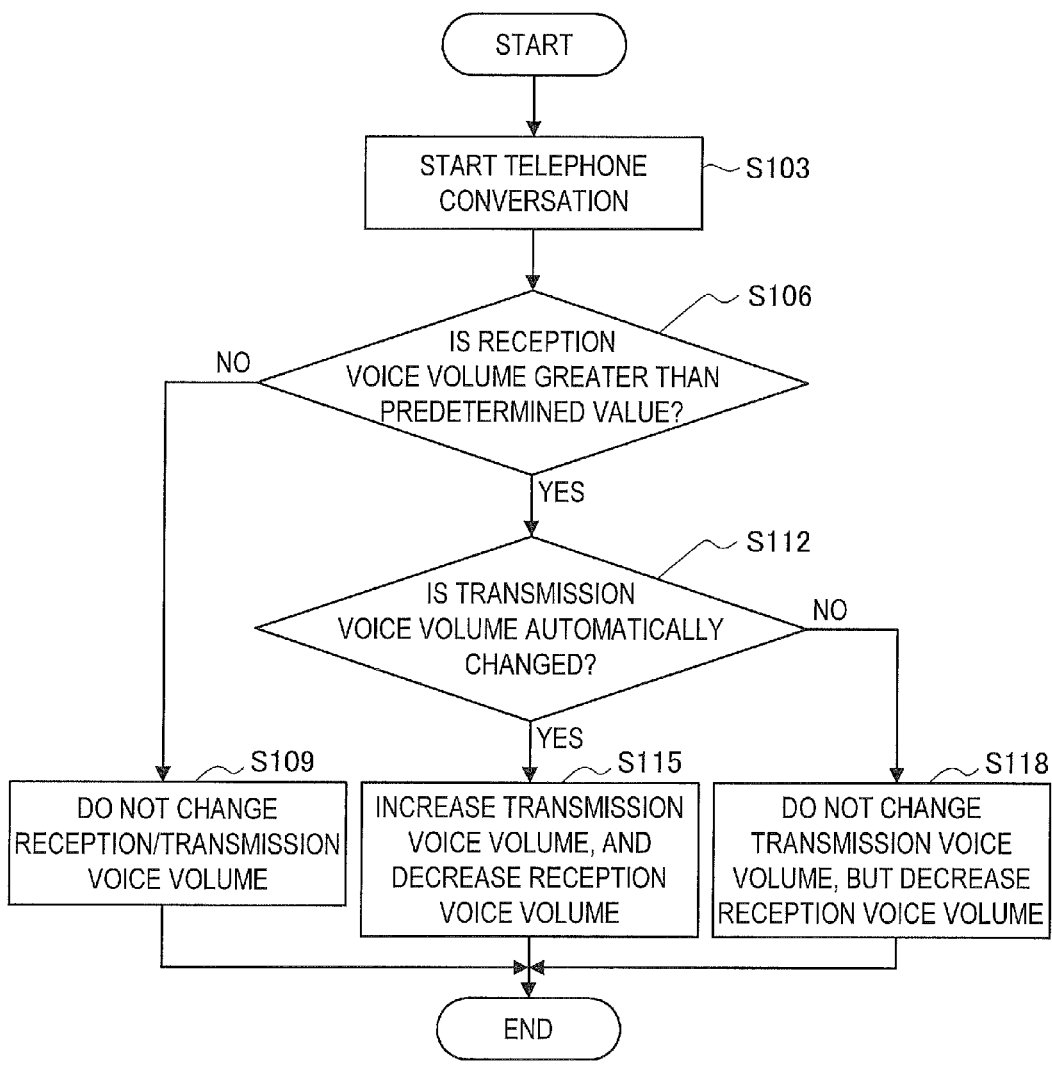
FIG. 3 is a flowchart illustrating first operational processing of the mobile phone terminal according to the first embodiment.

Generally speaking, people who are hard of hearing tend to speak loud because it is hard to pick up voice of an addressee. The mobile phone terminal 2 therefore can recognize, based on, for example, a voice volume (reception voice volume) of the user B, who is an addressee, whether the addressee is hard of hearing. FIG. 3 will be seen below to make the detailed description.

FIG. 3 is a flowchart illustrating the first operational processing of the mobile phone terminal 2 according to the present embodiment. As illustrated in FIG. 3, first, in step S103, the mobile phone terminal 2 starts a telephone conversation with a mobile phone terminal of the user B. Specifically, the control unit 20 of the mobile phone terminal 2 performs control such that the voice information of the user A collected by the mic 23 is coded and transmitted to a mobile phone terminal of the user B, and voice information received from the mobile phone terminal of the user B is decoded and output from the speaker 24.

Next, in step S106, the recognition section 201 of the control unit 20 determines whether a voice volume of the received voice information (reception voice) of the user B is greater than a predetermined value. If the reception voice is less than the predetermined value, the recognition section 201 recognizes that the user B is not hard of hearing. To the contrary, if the reception voice is greater than the predetermined value, the recognition section 201 recognizes that the user B is hard of hearing.

Next, if the reception voice is less than the predetermined value, that is, the recognition section 201 recognizes that the user B is not hard of hearing (S106/NO), the control unit 20 does not change, in step S109, the reception/transmission voice volume.

Next, if the reception voice is greater than the predetermined value, that is, the recognition section 201 recognizes that the user B is hard of hearing (S106/YES), the control unit 20 determines, in step S112, whether to automatically change the transmission voice volume. For example, when the setting of automatically changing the transmission voice volume is ON (or OK), the control unit 20 determines that the transmission voice volume is automatically changed. When the setting of automatically changing the transmission voice volume is OFF (or NO), the control unit 20 determines that the transmission voice volume is not automatically changed.

Next, if it is determined that the transmission voice volume is automatically changed (S112/YES), the signal processing control section 203 controls, in step S115, the signal processing unit 27 to increase the transmission voice volume and to decrease the reception voice volume. In response thereto, the transmission/reception voice volume processing section 271 of the signal processing unit 27 performs signal processing such that the voice (transmission voice) volume of the user A to be transmitted to the user B is increased, and also performs signal processing such that the received voice (reception voice) volume of the user B is decreased.

The mobile phone terminal 2 of the user A can hereby decrease and play back the voice (reception voice) volume of the user B that has been increased because the user B is hard of hearing, and can increase the voice (transmission voice) volume of the user A and transmit the voice of the user A to the user B, who is hard of hearing. Accordingly, it is possible to change (improve) the telephone conversation in accordance with needs of the user A and the user B such that both the users do not feel stressed.

Meanwhile, if it is determined that the transmission voice volume is not automatically changed (S112/NO), the signal processing control section 203 does not perform, in step S118, signal processing on the transmission voice volume, but performs signal processing to decrease the reception voice volume. The mobile phone terminal 2 of the user A can hereby decrease and play back the voice (reception voice) volume of the user B that has been increased because of poor hearing, and can change (improve) the voice volume such that a telephone conversation state satisfies a need of the user A in order to prevent at least the user A from feeling stressed.

As explained above, the first operational processing has been described in detail. According to the first operational processing, the mobile phone terminal 2 according to the present embodiment can recognize whether the user B, who is an addressee, is hard of hearing. If the user B is hard of hearing, the mobile phone terminal 2 increases the voice volume of the collected voice information of the user A and transmits the voice information to the user B in the increased voice volume, and decreases and plays back the voice volume of the received voice information of the user B so that the telephone conversation state can be improved.

In the flowchart illustrated in FIG. 3, the recognition section 201 recognizes, based on a voice volume of the voice information (reception voice) of the user B, whether the user B is hard of hearing. However, the recognition method according to each embodiment of the present disclosure is not limited thereto. For example, the recognition section 201 may determine, based on the age of the user B, whether the user B is hard of hearing. Generally speaking, people tend to have auditory disturbance with elapse of time, or at the age of 50 to 60 in most cases. Consequently, for example, if the user B is 50 to 60 years old or older, the recognition section 201 determines that the user B is hard of hearing. The recognition section 201 may determine the age of the user B based on analysis of the voice information of the user B, a facial image of the user B, or age information of the user B input in advance.

In the flowchart illustrated in FIG. 3, the recognition section 201 recognizes whether the user B, who is an addressee, is hard of hearing. However, a recognition target is not limited to an addressee in each embodiment of the present disclosure. The user A, who is speaking on the phone, may be a recognition target. Specifically, for example, the recognition section 201 recognizes, based on the voice volume of the voice (transmission voice) of the user A collected by the mic 23, whether the user A is hard of hearing (auditory disturbance). If it is determined that the user A is hard of hearing, the mobile phone terminal 2 decreases the voice volume of the collected voice information of the user A and transmits the voice information to the user B, and increases and plays back the volume of the received voice information of the user B so that the telephone conversation state can be improved.

(2-1-3. Second Operational Processing)

Figure 4:
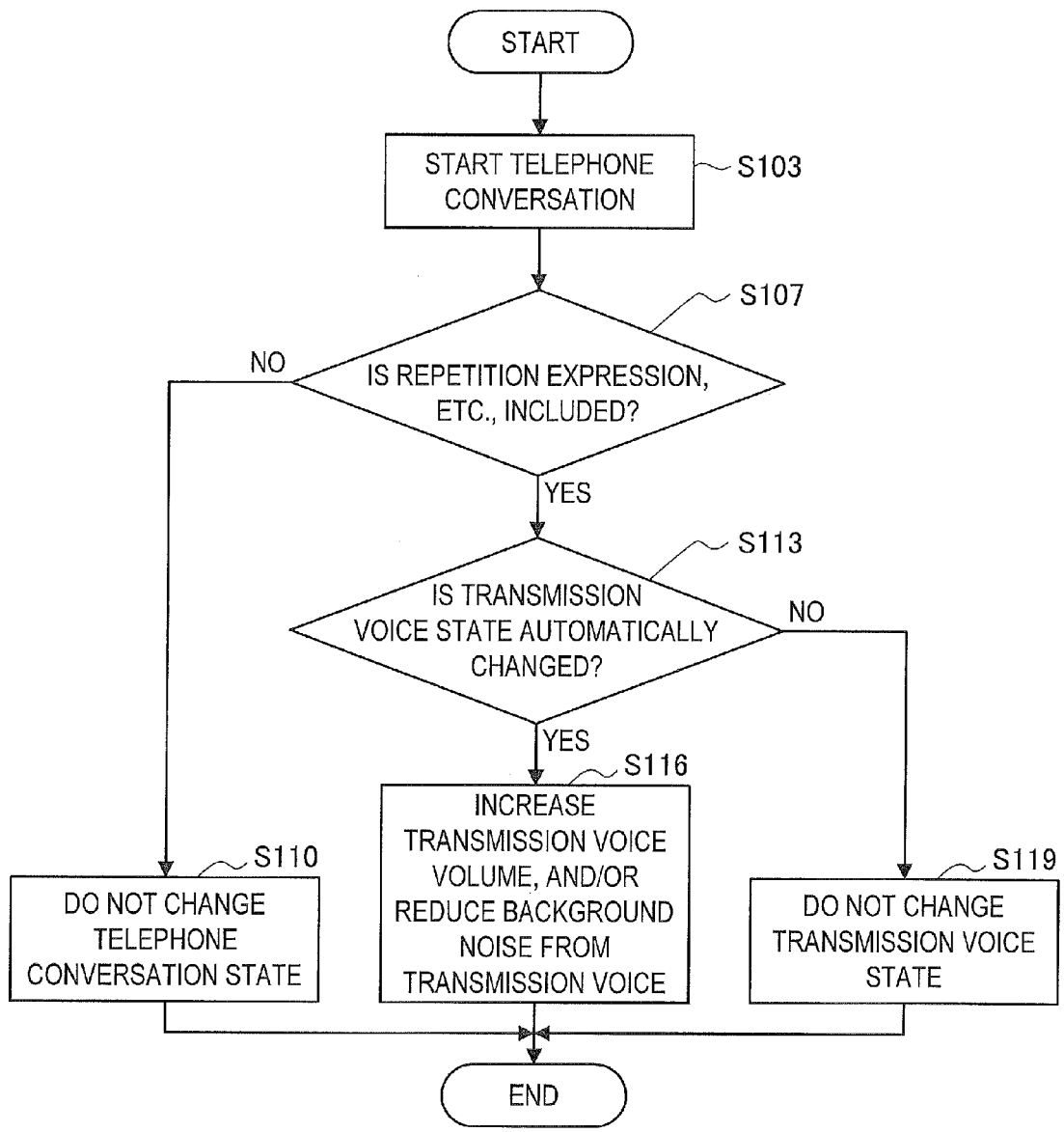
FIG. 4 is a flowchart illustrating second operational processing of the mobile phone terminal according to the first embodiment.

Next, the second operational processing will be described. Generally speaking, people who are not of poor hearing can be temporarily hard of hearing (low hearing ability) because of communication failure and loud background noise during a telephone conversation. According to the second operational processing, the mobile phone terminal 2 can recognize whether the user B, who is an addressee, is hard of hearing, and can change the telephone conversation state in accordance with the recognition result. FIG. 4 will be seen below to make the detailed description.

FIG. 4 is a flowchart illustrating the second operational processing of the mobile phone terminal 2 according to the present embodiment. As illustrated in FIG. 4, first, in step S103, the mobile phone terminal 2 starts a telephone conversation with a mobile phone terminal of the user B.

Next, in step S107, the recognition section 201 of the control unit 20 determines whether a repetition expression or the like is included in the received voice information (reception voice) of the user B. The repetition expression or the like means an expression used upon requesting the repetition such as "what?" and "pardon?" or an expression indicating that the user B has difficulty in hearing the voice of the user A such as "I did not hear you," "I did not catch you," and "please speak louder." The recognition section 201 analyzes the received voice information (reception voice) of the user B, and determines whether the repetition expression or the like is included. If the repetition expression or the like is included, the recognition section 201 can recognize that the user B is hard of hearing.

Next, if it is determined that the repetition expression or the like is not included in the reception voice, that is, the recognition unit 201 recognizes that the user B is not hard of hearing (S107/NO), the control unit 20 does not change, in step S110, the telephone conversation state.

Next, if it is determined that the repetition expression or the like is included in the reception voice, that is, the recognition section 201 recognizes that the user B is hard of hearing (S107/YES), the control unit 20 determines, in step S113, whether to automatically change the transmission voice state. For example, when the setting of automatically changing the transmission voice state is ON (or OK), the control unit 20 determines that the transmission voice state is automatically changed. To the contrary, if the setting of automatically changing the transmission voice state OFF (or NO), the control unit 20 determines that the transmission voice state is not automatically changed.

Next, if it is determined that the transmission voice state is automatically changed (S113/YES), the signal processing control section 203 controls, in step S116, the signal processing unit 27 to perform signal processing of increasing the transmission voice volume and/or signal processing of reducing background noise from the transmission voice. In response thereto, the transmission/reception voice volume processing section 271 of the signal processing unit 27 performs signal processing of increasing the voice (transmission voice) volume of the user A that is to be transmitted to the user B. The noise reduction processing section 273 of the signal processing unit 27 performs signal processing of reducing background noise from the voice (transmission voice) of the user A that is to be transmitted to the user B.

The voice of the user A becomes hereby easy for the user B to hear, and the user A does not requested by the user B to repeat. The user A and the user B therefore feel less stressed, and the telephone conversation state is improved.

To the contrary, if it is determined that the transmission voice state is not automatically changed (S113/NO), the signal processing control section 203 does not perform, in step S119, signal processing on the transmission voice volume.

As explained above, the second operational processing has been described in detail. According to the second operation processing, the mobile phone terminal 2 according to the present embodiment can recognize whether the user B, who is an addressee, is hard of hearing. If the user B is hard of hearing, the mobile phone terminal 2 can increase the voice volume of the collected voice information of the user A, and can reduce background noise from the voice information of the user A to transmit the voice information having the background noise reduced therefrom to the user B so that the telephone conversation state is improved.

In the flowchart illustrated in FIG. 3, the recognition section 201 recognizes whether the user B, who is an addressee, is hard of hearing. However, a recognition target is not limited to an addressee in each embodiment of the present disclosure. The user A, who is speaking on the phone, may be a recognition target. Specifically, for example, the recognition section 201 analyzes the voice (transmission voice) of the user A collected by the mic 23, and recognizes, based on whether the repetition expression or the like is included, whether the user A is hard of hearing. If it is determined that the user A is hard of hearing, the mobile phone terminal 2 can increase the voice volume of the received voice information of the user B and can reduce background noise from the voice information of the user B so that the telephone conversation state is improved.

(2-1-4. Third Operational Processing)

Next, the third operational processing will be described. Generally speaking, it is not uncomfortable to hear voice of a friendly person from a close place, while it is uncomfortable to hear voice of an unfriendly person from a close place. According to the third operational processing, the mobile phone terminal 2 recognizes a relationship between the user A and the user B, who is an addressee, and changes a telephone conversation state in accordance with the recognition result, thereby providing a comfortable telephone conversation state. Specifically, the audio signal processing section 275 of the signal processing unit 27 according to the present embodiment performs signal processing on the voice (reception voice) of the user B such that the voice of the user B is heard from a distance according to the relationship between the user A and the user B, and localizes a sound image. FIGS. 5 to 8 will be seen below to make the detailed description.

Sound Image Localization Processing

Even if voice information is played back from the single speaker 24 of the mobile phone terminal 2 as illustrated in FIG. 1, the audio signal processing section 275 can produce feeling of distance by attenuating a high frequency component of the voice information.

Figures 5, 6:
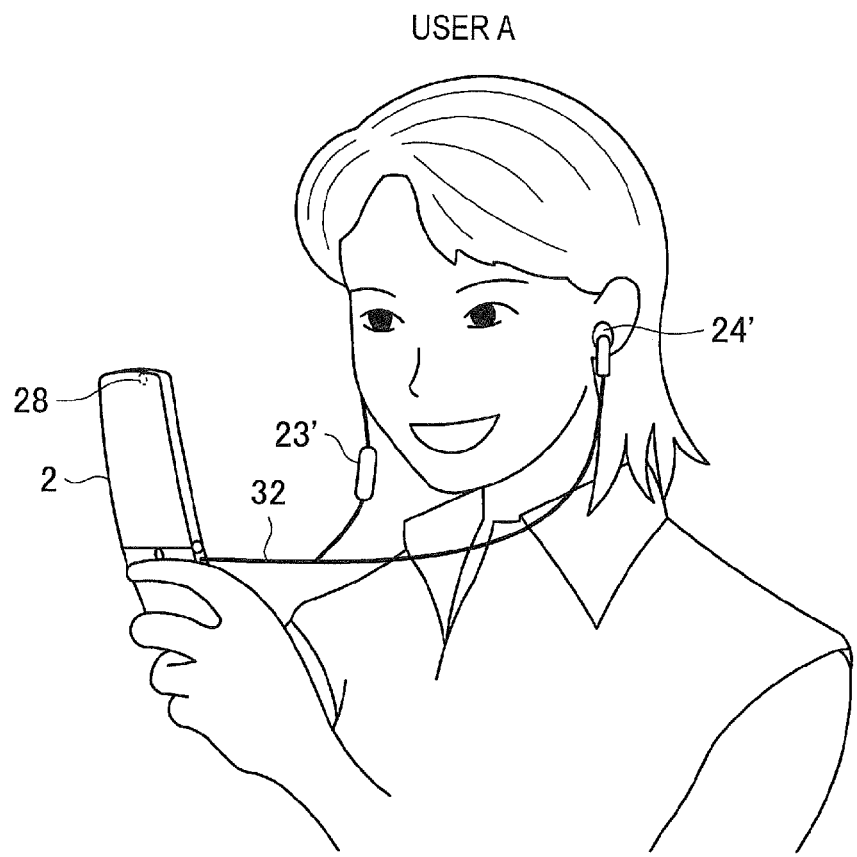
FIG. 5 is a diagram illustrating another use example of the mobile phone terminal.
FIG. 6 is a diagram illustrating an example of a relationship information table stored in a storage unit according to the present embodiment.

As illustrated in FIG. 5, it can be assumed that the user A is speaking with a headphone 32 connected to the mobile phone terminal 2. For example, as illustrated in FIG. 5, the headphone 32 has a mic 23' disposed on a cord, and an end of the cord has a plurality of speakers 24' disposed thereon. The voice of the user A is hereby collected by the mic 23', and the voice (voice information) of an addressee (user B) is output (played back) from the plurality of speakers 24'. In this case, the audio signal processing section 275 can perform sound image localization processing by convoluting a monophonic sound source with a head related transfer function (HRTF). The headphone 32 may include a head band headphone and a neck band headphone in addition to an in-ear headphone/canal headphone as illustrated in FIG. 5.

Localization Position for Sound Image

The audio signal processing section 275 may decide a localization position for a sound image in accordance with a relationship between the user A and the user B. The relationship between the user A and the user B is recognized by the recognition section 201. As illustrated in FIG. 5, the recognition section 201 may recognize the relationship, based on an image obtained by the camera module 28 (in-camera), which is provided on the mobile phone terminal 2, capturing the face of the user A. Specifically, if, for example, the user A has a smile, the recognition section 201 recognizes that the user A is friendly to the user B, who is an addressee.

The recognition section 201 may recognize the relationship, based on relationship information of the user A and the user B, which is input by the user A. FIG. 6 illustrates an example of a relationship information table stored in the storage unit 29. As illustrated in FIG. 6, for example, a relationship between the user A and the user B is friend, a relationship between the user A and a user C is special (husband and wife, boyfriend and girlfriend, or the like), and a relationship between the user A and a user D is work-related. Such information is stored as a relationship information table 291.

The recognition section 201 may recognize the relationship between the user A and the user B, based on groups (such as a friend group, a work group, and a special group) of address data set by the user A.

The signal processing control section 203 controls the audio signal processing section 275 in accordance with the relationship between the user A and the user B recognized by the recognition section 201 in this way such that an sound image of the user B is localized at a predetermined position. The friendlier the relationship between the user A and the user B becomes, the closer to the user A, a sound image of the user B may be localized. The more unfriendly the relationship between the user A and the user B becomes, the farther from the user A, a sound image of the user B may be localized.

Figure 7:
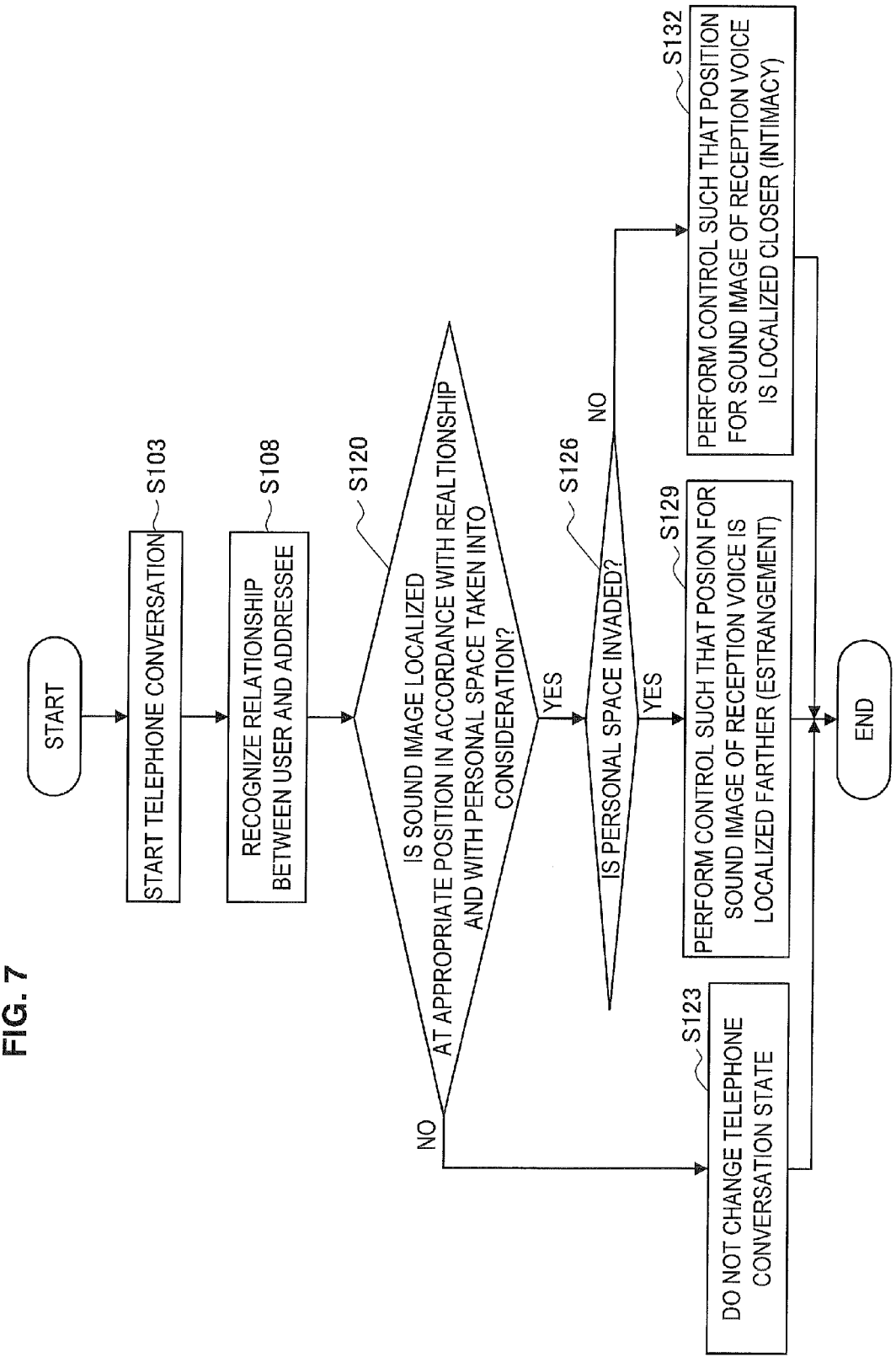
FIG. 7 is a flowchart illustrating third operational processing of the mobile phone terminal according to the present embodiment.
Figure 8:
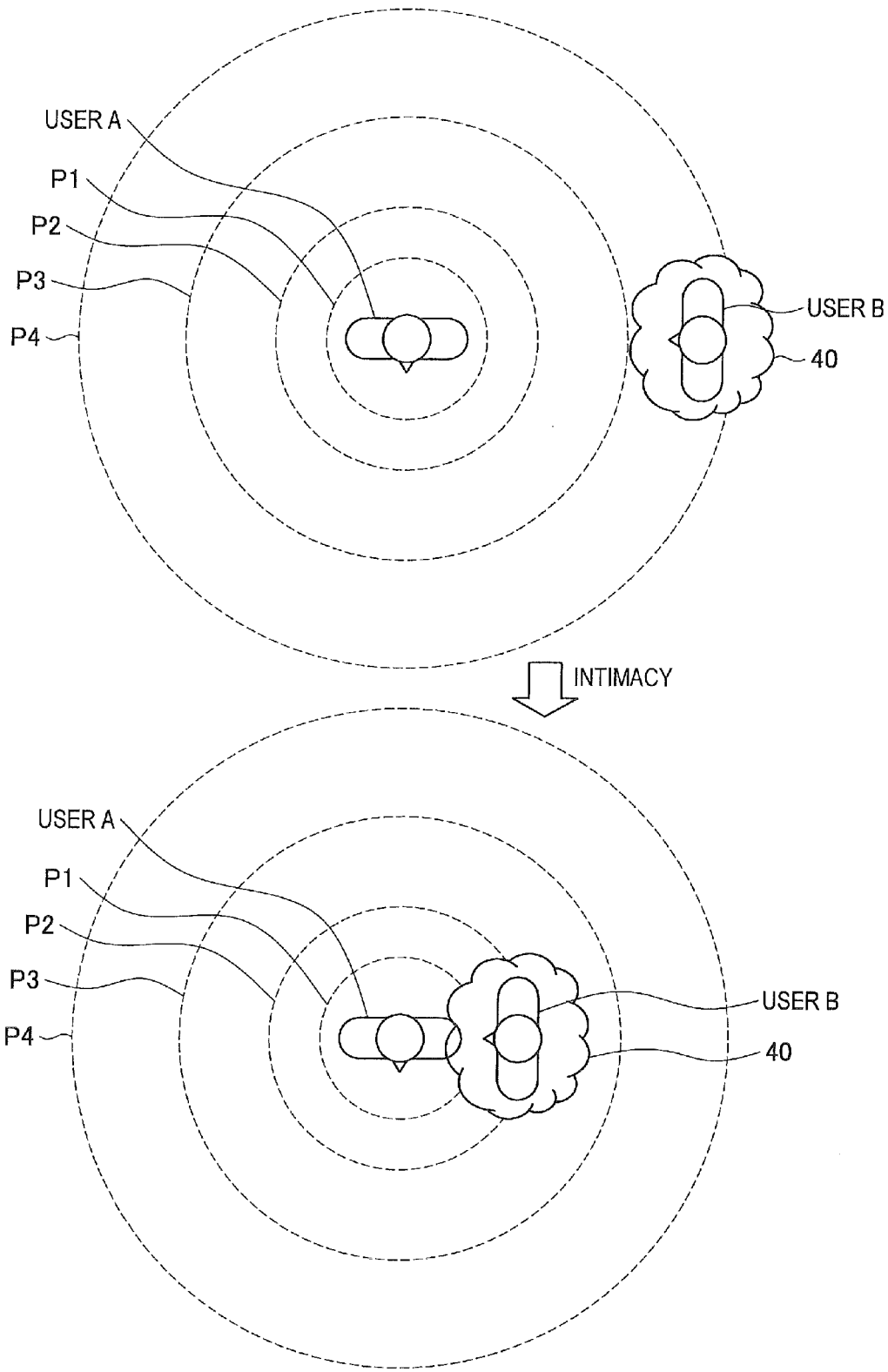
FIG. 8 is a diagram for describing a personal space and a localization position for a sound image of a user B.

Furthermore, the signal processing control section 203 may control a localization position for a sound image of the user B with a personal space of the user A according to the relationship between the user A and the user B taken into consideration. FIGS. 7 to 8 will be seen below to make the detailed description.

Control on Localization Position for Sound Image with Personal Space Taken into Consideration FIG. 7 is a flowchart illustrating the third operational processing of the mobile phone terminal 2 according to the present embodiment. As illustrated in FIG. 7, first, in step S103, the mobile phone terminal 2 starts a telephone conversation with a mobile phone terminal of the user B.

Next, in step S108, the recognition section 201 of the control unit 20 recognizes a relationship between the user A and the user B. Specifically, as described above, the recognition section 201 may recognize the relationship by referring to, for example, the relationship information table 291 that is registered in advance by the user A.

Next, in step S120, the signal processing control section 203 determines whether a sound image is localized at an appropriate position decided by taking into consideration the personal space of the user A according to the relationship between the user A and the user B. For example, the control unit 20 does not perform sound image localization processing on the received voice information of the user B, but performs control such that the voice information is played back from the speaker 24 in default. The control unit 20 determines whether the localization position for the sound image of the user B is an appropriate position if the personal space according to the relationship between the user A and the user B is taken into consideration.

The personal space is a space people have, and if the region is approached by another person, people feel uncomfortable. The personal space is narrower for a friendly person, while the personal space is broader for an unfriendly person. The personal space is generally categorized into four zones: an intimate distance; a personal distance; a social distance; and a public distance. FIG. 8 will be seen below to make the detailed description.

FIG. 8 is a diagram for describing the personal space (areas P1 to P4), and a localization position for a sound image 40 of the user B. As illustrated in FIG. 8, the area P1 within the intimate distance (approximately 0 to 45 cm) around A who serves as the center accepts very intimate people. The area P2 within the personal distance (approximately 45 to 120 cm) around the user A is a space in which the user A can talk with personally intimate people without sitting down. The area 3 within the social distance (approximately 120 to 360 cm) around the user A is a space used for business. The area 4 within the public distance (approximately 360 to 750 cm) around the user A is a space in which the user A can view a plurality of people and one directional communication (relationship between a lecturer and audience) is frequently performed.

In this way, since the personal space is categorized into the spaces of different distances in accordance with the relationship between the user A and the user B, the signal processing control section 203 determines the localization position for the sound image 40, based on an appropriate personal space according to the relationship between the user A and the user B, thereby providing a more comfortable telephone conversation state to the user A.

Next, if the localization position for the sound image of the user B is an appropriate position (S120/YES), the control unit 20 does not change, in step S123, the telephone conversation state.

Next, if the localization position for the sound image of the user B is not an appropriate position (S120/NO), the signal processing control section 203 determines, in step S126, whether the localization position for the sound image of the user B invades the persona space of the user A.

For example, when a relationship between the user A and the user B is "work" and the localization position for the sound image of the user B is included in the area P1, which accepts very intimate people, the signal processing control section 203 determines that the personal space is invaded (S126/YES). In this case, since the user A probably feels uncomfortable, the signal processing control section 203 controls, in next step S129, the audio signal processing section 275 to set the localization position for the sound image (localization position for the sound image of the reception voice) of the user B farther away (estrangement). For example, the signal processing control section 203 can provide a more comfortable telephone conversation state to the user A by localizing the localization position for the sound image 40 of the user B in the area P3.

Meanwhile, when a relationship between the user A and the user B is "friend," as illustrated in FIG. 6, and a localization position for the sound image 40 of the user B is included in the area P4, as illustrated in FIG. 8, the signal processing control section 203 determines that the personal space is not invaded (S126/NO). In this case, the signal processing control section 203 controls, in next step S132, the audio signal processing section 275 to set the localization position for the sound image (localization position for the sound image of the reception voice) of the user B closer (intimacy). For example, the signal processing control section 203 can provide a comfortable telephone conversation state to the user A by localizing the localization position for the sound image 40 of the user B in the area P2, as illustrated in FIG. 8.

As explained above, the third operational processing has been described in detail. According to the third operational processing, the mobile phone terminal 2 according to the present embodiment can control a localization position for a sound image of the user B, who is an addressee, in accordance with a relationship between the user A and the user B.

Additionally, the relationship between the user A and the user B is not necessarily the same for the user A and the user B. Consequently, control on a localization position for a sound image of an addressee is performed by the user A with respect to relationship information input by the user A. That is, for example, even if the mobile phone terminal 2A of the user A is controlled such that the localization position for the sound image of the user B is included in the area P1, the mobile phone terminal 2B of the user B is sometimes controlled such that a localization position for a sound image of the user A is included in P2. The mobile phone terminal 2 according to the present embodiment can hereby improve the telephone conversation state to a state satisfying needs of both the users without having both the users have unfriendly feeling. The mobile phone terminal 2 may be secured such that the relationship information table 291 stored in the storage unit 29 is not leaked to the others.

In the third operational processing, the localization position for the sound image of the user B (addressee) is controlled based on the relationship between the user A and the user B. However, control on a localization position for a sound image according to each embodiment of the present disclosure is not limited thereto. For example, the signal processing control section 203 may control a localization position for a sound image in accordance with a state (good/bad, and good mood/bad mood) of the user A. Specifically, the more satisfactory the state (the more satisfactory mood) of the user A becomes, the closer to the user A the sound image is localized. The worse the state (worse the mood) of the user A becomes, the farther from the user A the sound image is localized. Such a state of the user A may be recognized by, for example, the recognition section 201, based on an image obtained by the camera module 28 capturing the face of the user A in real time, or a time zone (people are generally in a bad mood in the midnight and early morning).

In the third operational processing, it has been described that a relationship between the user A and the user B is registered in advance by the user A. However, control on a localization position for a sound image according to each embodiment of the present disclosure is not limited thereto. For example, the recognition section 201 may recognize a relationship between the user A and the user B in real time. Specifically, the recognition section 201 may recognize the relationship with the user B, based on an image obtained by, for example, the camera module 28 capturing the face of the user A in real time, or may recognize the relationship with the user B by analyzing the voice information of the user A collected by the mic 23.

In the third operational processing, it has been described that a position for a sound image is not localized at first, and the localization position for the sound image is controlled in accordance with a relationship with the user B or a state (mood) of the user A. However, control on a localization position for a sound image according to each embodiment of the present disclosure is not limited thereto. For example, the signal processing control section 203 may localize a sound image at positions (in three steps, for example) (a concept of the personal space may be taken into consideration) set in advance in accordance with an addressee, and may further control the localization position for the sound image in real time in accordance with a state (mood) of the user A during a telephone conversation, and a content of the telephone conversation.

The signal processing control section 203 may also localize a sound image the farthest in default, and may perform control such that the sound image is localized closer and closer after the telephone conversation has started, in accordance with a relationship with an addressee, and a state of the user A.

2-2. Second Embodiment

In the first embodiment, the mobile phone terminal 2 is used as an example of the signal processing apparatus. However, the signal processing apparatus (signal processing system) according to each embodiment of the present disclosure is not limited to a communication terminal such as the mobile phone terminal 2.

Figure 9:
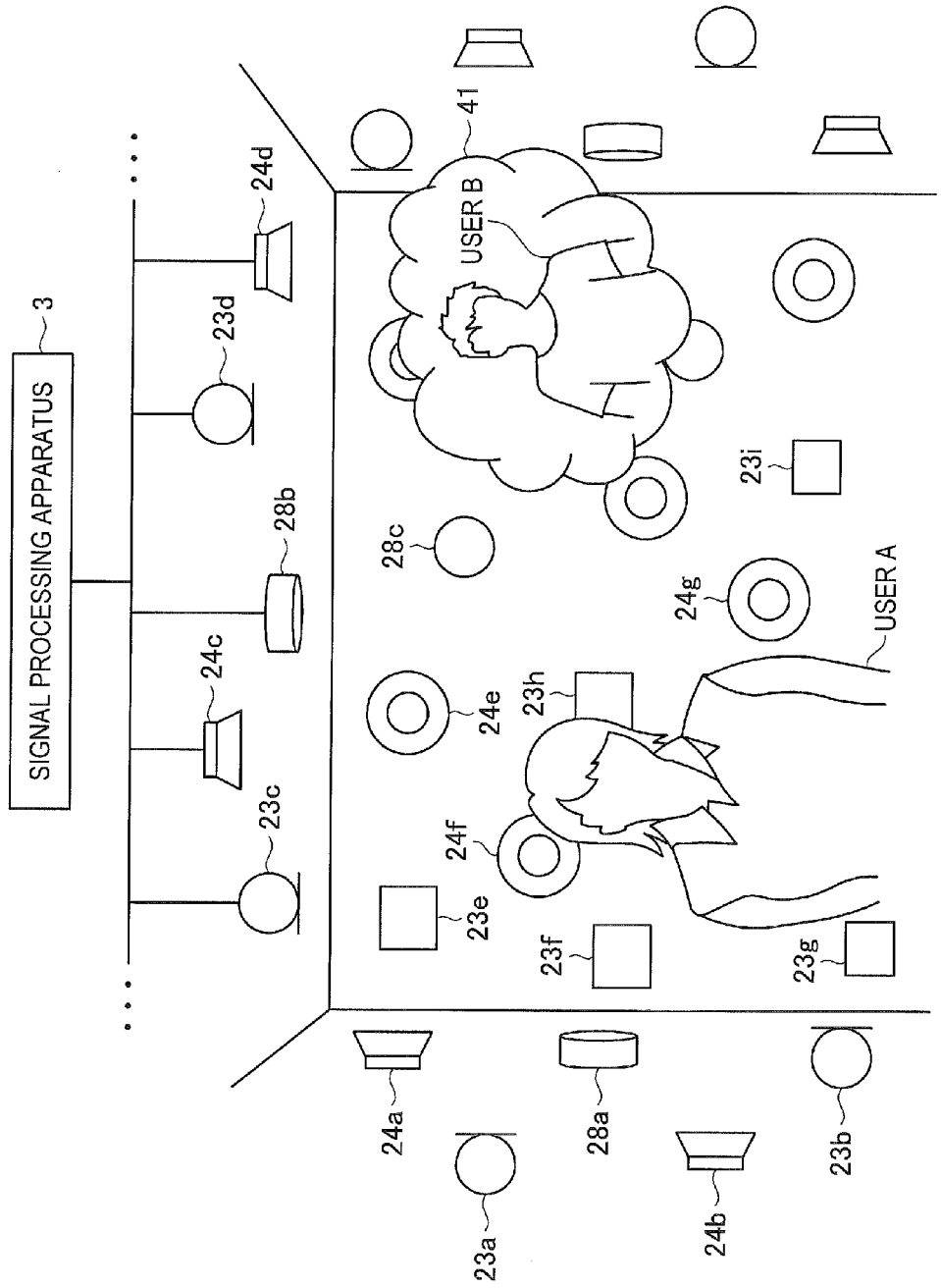
FIG. 9 is a diagram for describing an overview of a signal processing system according to a second embodiment.

For example, the signal processing system according to each embodiment of the present disclosure has a plurality of mics, speakers, and cameras disposed in various places inside and outside buildings. The signal processing system according to each embodiment of the present disclosure may be therefore applicable to a new communication system in which a user can have a telephone conversation with a partner user in a remote location even if the user does not have a communication terminal. With reference to FIGS. 9 to 10, a second embodiment will be specifically described that is applied to such a new communication system.

(2-2-1. Overview of System)

FIG. 9 is a diagram for describing an overview of a signal processing system according to the second embodiment. As illustrated in FIG. 9, in the signal processing system according to the present embodiment, pluralities of mics 23a to 23N, speakers 24a to 24N, and camera modules (which will be referred to as the camera, hereinafter) 28a to 28N are disposed, for example, on walls, the floor, and the ceiling of a building. Additionally, in the signal processing system according to the present embodiment, various sensors such as a motion sensor may be provided in addition to the mics, the speakers, and the camera as illustrated in FIG. 9.

The pluralities of mics 23a to 23N, speakers 24a to 24N, and cameras 28a to 28N are connected to a signal processing apparatus 3. The signal processing apparatus 3 inputs and outputs information.

The plurality of mics 23a to 23N disposed on the walls and the ceiling collects the voice articulated by the user A, and outputs the collected voice information to the signal processing apparatus 3. The signal processing apparatus 3 performs predetermined signal processing (such as coding) on the voice of the user A output from the mics 23a to 23N, and transmits the voice subjected to the predetermined signal processing to a signal processing apparatus (not shown) that inputs information to and outputs information from mics and speakers disposed in an area of the user B, who is an addressee.

The signal processing apparatus in the area of the user B performs predetermined signal processing (such as decoding) on the voice of the user A transmitted from the signal processing apparatus 3, and plays back the voice from the plurality of speakers disposed in the area of the user B. The signal processing apparatus in the area of the user B further performs predetermined signal processing (such as coding) on the voice of the user B collected by the plurality of mics disposed in the area of the user B, and transmits the voice subjected to the predetermined signal processing to the signal processing apparatus 3 in the area of the user A.

The signal processing apparatus 3 in the area of the user A performs predetermined signal processing (such as decoding) on the received voice of the user B, and plays back the voice subjected to the predetermined signal processing from the plurality of speakers 24a to 24N disposed in the area of the user A.

The user A can hereby have a telephone conversation with the partner user B in a remote location even if the user A does not have a communication terminal such as the mobile phone terminal 2. It has been described above as a new communication system that the user B can also have a telephone conversation with a partner user without having anything with the user B as long as the pluralities of mics and speakers are disposed in the same way as the area of the user A. However, the embodiment of the present disclosure is not limited thereto. For example, the signal processing apparatus in the area of the user B may be a communication terminal such as the mobile phone terminal 2 described in the first embodiment.

As illustrated in FIG. 9, the signal processing system according to the present embodiment has the plurality of cameras 28a to 28N disposed on the walls and the ceiling. The signal processing apparatus 3 hereby grasps a position of the user A, and uses the grasped position information of the user A for performing control such that a sound image 41 of the user B is localized.

As explained above, the overview of the signal processing apparatus 3 has been described. Next, with reference to FIG. 10, a configuration of the signal processing apparatus 3 according to the present embodiment will be specifically described.

(2-2-2. Configuration)

FIG. 10 is a block diagram illustrating the configuration of the signal processing apparatus 3 according to the second embodiment. As illustrated in FIG. 10, the signal processing apparatus 3 according to the present embodiment includes a control unit 20', a signal processing unit 27, a storage unit 29, and a communication interface (I/F) 30.

Although the mics 23a to 23N, the speakers 24a to 24N, an amplifier/ADC 25, a DAC/amplifier 26, the cameras 28a to 28N are configured separately from the signal processing apparatus 3 in the example illustrated in FIG. 10, they may be included in the signal processing apparatus 3.

Since the mics 23a to 23N, the amplifier/ADC 25, the speakers 24a to 24N, the DAC/amplifier 26, the signal processing unit 27, the cameras 28a to 28N, the storage unit 29, and the communication I/F 30 are configured in the same way as the respective configurations of the mobile phone terminal 2 according to the first embodiment described with reference to FIG. 2, the descriptions will be omitted here.

(Control Unit)

The control unit 20' has a function of controlling each configuration of the signal processing apparatus 3. Specifically, as illustrated in FIG. 10, the control unit 20' according to the present embodiment functions as a state/relationship recognition section 202, a signal processing control section 203', a command recognition section 204, and an identification section 205.

State/Relationship Recognition Section

For example, the state/relationship recognition section 202 recognizes a state of the user A, a state of the user B, who is an addressee, or a relationship between the user A and the user B, based on a captured image, analysis of voices, or the relationship information table 291 in the same way as the recognition section 201 described with reference to FIG. 2.

Signal Processing Control Section

The signal processing control section 203' controls the signal processing unit 27 to perform predetermined signal processing on voice information in accordance with the recognition result of the state/relationship recognition section 202.

Command Recognition Section

The command recognition section 204 analyzes voice of a user collected by the plurality of mics 23a to 23N, and recognizes a command. For example, the command recognition section 204 morphologically analyzes the voice of the user A such as "I would like to talk with B," and recognizes a call request command.

Identification Section

The identification section 205 has a function of identifying (deciding) a connection destination for acquiring voice and an image corresponding to a target having a contact request from the user A, in accordance with the command recognized by the command recognition section 204. Specifically, for example, the identification section 205 inquires a management server (not shown) through the communication I/F 30, and acquires a connection destination (such as an IP address of a signal processing apparatus in the area of the user B) corresponding to a target (such as the user B) having a contact request.

As explained above, the signal processing apparatus 3 according to the second embodiment has been described. According to the configuration, the signal processing apparatus 3 according to the present embodiment can also improve the telephone conversation state in accordance with a state of a user, in the same as the first embodiment.

For example, if recognizing through the state/relationship recognition section 202 that an addressee (user B) is hard of hearing, the signal processing apparatus 3 increases a transmission voice (voice information of the user A) volume, and decreasing a reception voice (voice information of the user B) volume, thereby improving the telephone conversation state.

If recognizing through the state/relationship recognition section 202 that an addressee (user B) has low hearing ability, the signal processing apparatus 3 increases a transmission voice (voice information of the user A) volume, and decreasing a reception voice (voice information of the user B) volume, thereby improving the telephone conversation state.

The signal processing apparatus 3 can also perform signal processing on reception voice, based on a relationship between the user A and the user B recognized by the state/relationship recognition section 202, such that the sound image of the addressee is localized at an appropriately distant position, and can play back the reception voice from the plurality of speakers 24a to 24N. In the present embodiment, use of the plurality of speakers 24a to 24N disposed around the user A allows control on a localization position for the sound image of the addressee to be more precisely performed with the personal space taken into consideration. A reference number N means that N mics, N speakers and N cameras are included, is used. However, the different number of mics, speakers and cameras may be naturally included.

3. CONCLUSION

As described above, the signal processing apparatus (mobile phone terminal 2 and signal processing apparatus 3) according to the present embodiment can change a telephone conversation state in accordance with an environment of a user.

More specifically, the mobile phone terminal 2 according to the present embodiment can automatically change (improve) a telephone conversation state in accordance with a state of the user A/user B or a relationship between the user A and the user B while the user A have a conversation with the user B.

It should be understood by those skilled in the art that various modifications, combinations, sub-combinations and alterations may occur depending on design requirements and other factors insofar as they are within the scope of the appended claims or the equivalents thereof.

For example, if a relationship between the user A and the user B is unfriendly, the signal processing apparatus according to each embodiment of the present disclosure performs signal processing such that the voice information of the addressee (user B) is changed to a voice timbre of a character or the like that the user A likes. The signal processing apparatus further plays back the changed voice, thereby reducing unfriendly feeling of the user A.

The signal processing apparatus according to each embodiment of the present disclosure can also change a telephone conversation state in accordance with a user manipulation. For example, even if the signal processing control sections 203 and 203' each automatically change the telephone conversation state, a user can (manually) undo the telephone conversation state or further change the telephone conversation state.

Additionally, the present technology may also be configured as below:

(1) A signal processing apparatus including:
a recognition section configured to recognize at least one of a state of a first user, a state of a second user, and a relationship between the first user and the second user;
a signal processing unit configured to perform signal processing on voice information corresponding to voice articulated by the first user, or voice information corresponding to voice that is transmitted from a remote location and articulated by the second user; and
a control unit configured to control the signal processing unit to perform signal processing on at least one of the voice information corresponding to the voice articulated by the first user, and the voice information corresponding to the voice that is transmitted from the remote location and articulated by the second user, in accordance with a recognition result of the recognition section.

(2) The signal processing apparatus according to (1), wherein the recognition section recognizes the state of the first user or the state of the second user, by analyzing the voice information corresponding to the voice articulated by the first user, or the voice information corresponding to the voice articulated by the second user.

(3) The signal processing apparatus according to (1) or (2), wherein the recognition section recognizes the relationship between the first user and the second user, based on relationship information with respect to the second user, the relationship information being input by the first user.

(4) The signal processing apparatus according to any one of (1) to (3), wherein the recognition section recognizes, based on a facial image obtained by capturing a face of the first user or the second user, a state of a captured user or a relationship between the captured user and a partner user.

(5) The signal processing apparatus according to any one of (1) to (4), wherein the control unit controls the signal processing unit to perform voice volume control on voice information, background noise reduction control on the voice information, or sound image localization control, in accordance with the recognition result of the recognition section.

(6) The signal processing apparatus according to any one of (1) to (5), wherein the recognition section analyzes the voice information corresponding to the voice articulated by the first user or the second user, and, if a voice volume of the voice information is greater than a predetermined value, the recognition section recognizes that a user who has articulated the voice has low hearing ability.

(7) The signal processing apparatus according to any one of (1) to (6), wherein, if an age of the first user or the second user is older than a predetermined value, the recognition section recognizes that a user who is older than the predetermined value has low hearing ability.

(8) The signal processing apparatus according to any one of (1) to (7), wherein the recognition section analyzes the voice information corresponding to the voice articulated by the first user or the second user, and, if a repetition expression is included in the voice information, the recognition section recognizes that a user who has articulated the voice has low hearing ability.

(9) The signal processing apparatus according to any one of (1) to (8), wherein the control unit controls the signal processing unit to decrease, below a predetermined value, a voice volume of voice information corresponding to voice articulated by a user who has been recognized by the recognition section as having low hearing ability, and to increase, to the predetermined value or more, a voice volume of voice information corresponding to voice articulated by a partner user.

(10) The signal processing apparatus according to any one of (1) to (9), wherein the control unit controls the signal processing unit to reduce background noise of voice information corresponding to voice articulated by a partner user, the voice articulated by the partner user being transmitted to a user who has been recognized by the recognition section as having low hearing ability.

(11) The signal processing apparatus according to any one of (1) to (10), wherein the control unit controls the signal processing unit in a manner that a position for a sound image of the voice articulated by the second user is localized closer to the first user as the state of the first user or the relationship between the first user and the second user is more satisfactory, or more intimate.

(12) The signal processing apparatus according to any one of (1) to (11), wherein the control unit controls the signal processing unit to localize a sound image of the voice articulated by the second user at a localization position for a sound image set in advance in accordance with the relationship between the first user and the second user.

(13) The signal processing apparatus according to (12), wherein the localization position for the sound image set in advance is set with a personal space of the first user taken into consideration.

(14) The signal processing apparatus according to any one of (1) to (13), wherein the control unit controls the signal processing apparatus to localize a sound image of the voice articulated by the second user farther than a predetermined distance at a time of starting a telephone conversation, and to thereafter localize the sound image of the voice articulated by the second user closer to the first user as the state of the first user or a content of the telephone conversation is more satisfactory.

(15) The signal processing apparatus according to any one of (1) to (14), wherein the control unit controls signal processing performed by the signal processing unit on voice information, in accordance with an instruction of a user.

(16) The signal processing apparatus according to any one of (1) to (15), wherein the signal processing apparatus is a mobile phone, a smartphone, a tablet terminal, a PHS, or a landline telephone.

(17) The signal processing apparatus according to any one of (1) to (15), wherein the control unit performs control in a manner that voice information corresponding to voice that is collected by a plurality of microphones disposed around the first user and articulated by the first user is transmitted to the remote location, and the voice information corresponding to the voice that is transmitted from the remote location and articulated by the second user is output from a plurality of speakers disposed around the first user.

(18) A non-transitory computer-readable storage medium having a program stored therein, the program causing a computer to function as:
a recognition section configured to recognize at least one of a state of a first user, a state of a second user, and a relationship between the first user and the second user;
a signal processing unit configured to perform signal processing on voice information corresponding to voice articulated by the first user, or voice information corresponding to voice that is transmitted from a remote location and articulated by the second user; and
a control unit configured to control the signal processing unit to perform signal processing on at least one of the voice information corresponding to the voice articulated by the first user, and the voice information corresponding to the voice that is transmitted from the remote location and articulated by the second user, in accordance with a recognition result of the recognition section.

The present disclosure contains subject matter related to that disclosed in Japanese Priority Patent Application JP 2012-206849 filed in the Japan Patent Office on Sep. 20, 2012, the entire content of which is hereby incorporated by reference.

What is claimed is:

1. A signal processing apparatus comprising:
    a recognition section configured to recognize at least one of a state of a first user, a state of a second user, and a relationship between the first user and the second user based on information corresponding to the first user and/or the second user;
    a signal processing unit configured to perform signal processing on voice information corresponding to voice articulated by the first user, and voice information corresponding to voice that is transmitted from a remote location and articulated by the second user,
    wherein the signal processing performed on the voice information corresponding to the voice articulated by the first user is based on the signal processing performed on the voice information corresponding to the voice that is transmitted from the remote location and articulated by the second user; and
    a control unit configured to control the signal processing unit to perform signal processing on the voice information corresponding to the voice articulated by the first user, and the voice information corresponding to the voice that is transmitted from the remote location and articulated by the second user, in accordance with a recognition result of the recognition section.

2. The signal processing apparatus according to claim 1, wherein the recognition section recognizes the state of the first user or the state of the second user, by analyzing the voice information corresponding to the voice articulated by the first user, or the voice information corresponding to the voice articulated by the second user.

3. The signal processing apparatus according to claim 1, wherein the recognition section recognizes the relationship between the first user and the second user, based on relationship information with respect to the second user, the relationship information being input by the first user.

4. The signal processing apparatus according to claim 1, wherein the recognition section recognizes, based on a facial image obtained by capturing a face of the first user or the second user, the state of the first user or the second user or the relationship between the first user and the second user.

5. The signal processing apparatus according to claim 1, wherein the control unit controls the signal processing unit to perform voice volume control on the voice information corresponding to the voice articulated by the first user and the voice articulated by the second user, background noise reduction control on the voice information corresponding to the voice articulated by the first user and the voice articulated by the second user, or sound image localization control on a sound image corresponding to the voice articulated by the first user and on a sound image corresponding to the voice articulated by the second user, in accordance with the recognition result of the recognition section.

6. The signal processing apparatus according to claim 1, wherein the recognition section analyzes the voice information corresponding to the voice articulated by the first user and the second user, and,
    wherein the recognition section recognizes that the first user and/or the second user has low hearing ability in an event volume of the voice articulated by the first and/or the second user is greater than a predetermined value.

7. The signal processing apparatus according to claim 1, wherein the recognition section determines ages of the first user and the second user based on the voice information corresponding to the voice articulated by the first user and the second user, and
    wherein the recognition section recognizes that the first user and/or the second user is older and has low hearing ability in an event the determined age of the first user and/or the second user is greater than a predetermined value.

8. The signal processing apparatus according to claim 1, wherein the recognition section analyzes the voice information corresponding to the voice articulated by the first user and the second user, and,
    wherein the recognition section recognizes that the first user and/or the second user has low hearing ability in an event repetition expression is included in the voice information corresponding to the voice articulated by the first user and/or the second user.

9. The signal processing apparatus according to claim 1, wherein the recognition section analyzes the voice information corresponding to the voice articulated by the first user and the second user, and
    wherein the control unit controls the signal processing unit
        to decrease, below a predetermined value, a voice volume of the voice information corresponding to the voice articulated by one of the first user or the second user in an event one of the first user or the second user has been recognized by the recognition section as having low hearing ability based on the analysis, and
        to increase, to the predetermined value or more, a voice volume of the voice information corresponding to the voice articulated by other of the first user or the second user.

10. The signal processing apparatus according to claim 9, wherein the control unit controls the signal processing unit to reduce background noise of the voice information corresponding to the voice articulated by the other of the first user or the second a user,
    wherein the voice articulated by the other of the first user or the second user being transmitted to the one of the first user or the second user who has been recognized by the recognition section as having low hearing ability.

11. The signal processing apparatus according to claim 1, wherein the control unit controls the signal processing unit in a manner that a position for a sound image of the voice articulated by the second user is localized closer to the first user in an event the state of the first user or the relationship between the first user and the second user is satisfactory, or intimate based on the information corresponding to the first user and/or the second user.

12. The signal processing apparatus according to claim 1, wherein the control unit controls the signal processing unit to localize a sound image of the voice articulated by the second user at a localization position for a sound image set in advance in accordance with the relationship between the first user and the second user.

13. The signal processing apparatus according to claim 12, wherein the localization position for the sound image set in advance is set with a personal space of the first user taken into consideration.

14. The signal processing apparatus according to claim 1, wherein the control unit controls the signal processing unit to localize a sound image of the voice articulated by the second user to a distance greater than a predetermined distance in an event of starting a telephone conversation between the first user and the second user, and wherein the control unit controls the signal processing unit to localize the sound image of the voice articulated by the second user closer to the first user in an event the state of the first user or a content of the telephone conversation is satisfactory.

15. The signal processing apparatus according to claim 1, wherein the control unit controls signal processing performed by the signal processing unit on the voice information corresponding to the voice articulated by the first user and/or the second user, in accordance with an instruction from one of the first user and the second user.

16. The signal processing apparatus according to claim 1, wherein the signal processing apparatus is one or more of: a mobile phone, a smartphone, a tablet terminal, a PHS, and/or a landline telephone.

17. The signal processing apparatus according to claim 1, wherein the control unit performs control in a manner that the voice information corresponding to the voice articulated by the first user is collected by a plurality of microphones disposed around the first user and is transmitted to the remote location, and wherein the voice information corresponding to the voice articulated by the second user transmitted from the remote location is output from a plurality of speakers disposed around the first user.

18. A non-transitory computer-readable storage medium having stored thereon, a set of computer executable instructions, for causing a computer to perform steps comprising:

recognizing at least one of a state of a first user, a state of a second user, and a relationship between the first user and the second user based on information corresponding to the first user and/or the second user;

performing signal processing on voice information corresponding to a voice articulated by the first user, or voice information corresponding to voice that is transmitted from a remote location and articulated by the second user; and controlling the signal processing on at least one of the voice information corresponding to the voice articulated by the first user, and the voice information corresponding to the voice that is transmitted from the remote location and articulated by the second user, in accordance with a recognition result of the recognition, wherein a sound image of the voice articulated by the second user is localized at a predetermined position in accordance with the relationship between the first user and the second user.

\* \* \* \* \*